UNITED STATES PATENT OFFICE.

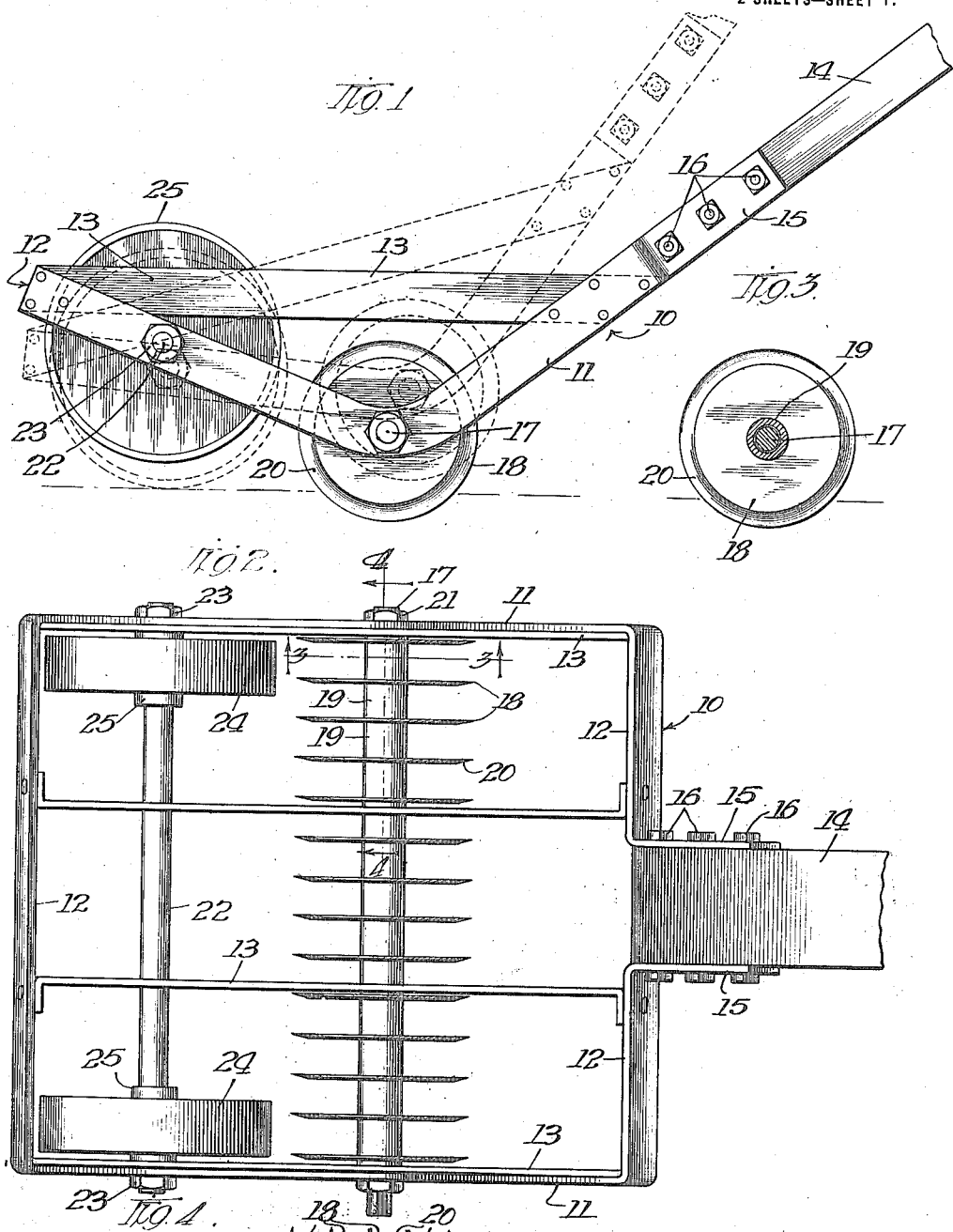

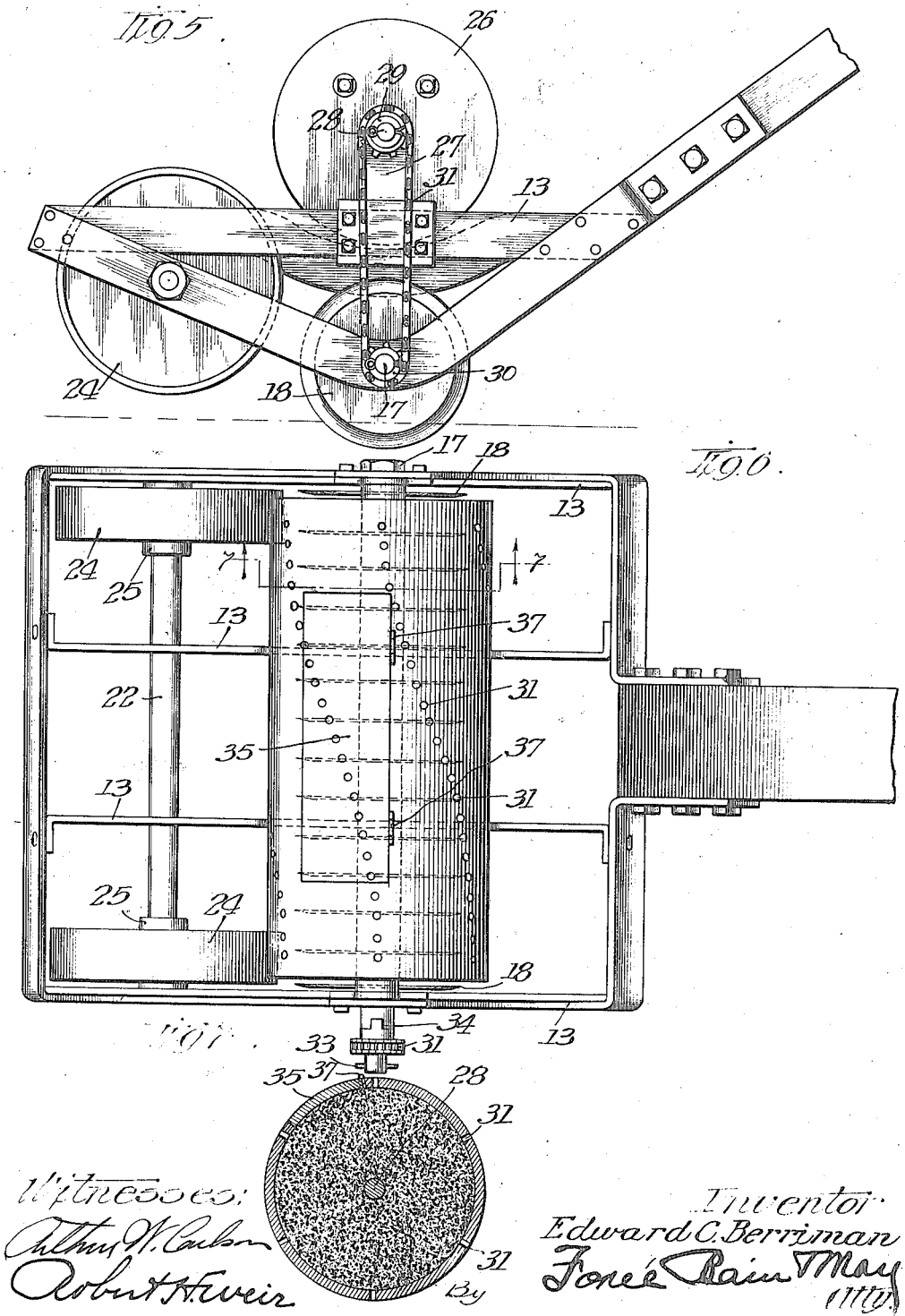

EDWARD C. BERRIMAN, OF CHICAGO, ILLINOIS.

METHOD OF TREATING TURF.

1,190,849.  Specification of Letters Patent.  Patented July 11, 1916.

Application filed November 30, 1915. Serial No. 64,253.

*To all whom it may concern:*

Be it known that I, EDWARD C. BERRIMAN, a citizen of the United States, residing at Chicago, in the county of Cook and State of Illinois, have invented certain new and useful Improvements in Methods of Treating Turf, of which the following is a specification.

My invention relates to a method of treating and cultivating grass plots or swards.

One of the objects of my invention is to provide a method of treating and cultivating turf whereby to clean it of noxious weeds, or undesirable plants; to aerate and enrich the soil in and around the root mat by the provision of suitable incisions made through the mat and into the underlying soil; to improve the method of irrigation by promoting the absorption of the water by the underlying soil accessible through said incisions and to provide a seed bed for the seeds within the underlying soil, and generally to improve the quality and character of the turf.

Other and further objects of my invention will become readily apparent to persons skilled in the art, from a consideration of the following description when taken in conjunction with the drawings, wherein:—

Figure 1 is a side elevation of a machine suitable for carrying my method into effect, and showing the machine in dotted lines, which position it occupies when it is necessary to turn it to the right or to the left. Fig. 2 is a plan view of the machine. Fig. 3 is a section taken on line 3—3 of Fig. 2. Fig. 4 is a section taken on line 4—4 of Fig. 2. Fig. 5 is a machine, similar to that shown in Fig. 1, with a seeding drum or cylinder mounted above the cutting or slashing knives. Fig. 6 is a plan view of the same. Fig. 7 is a section taken on line 7—7 of Fig. 6.

In all the views the same reference characters are employed to indicate similar parts.

My invention is especially applicable to the cultivation and seeding of grass, of a grass area of turf or green sward, commonly known as a "putting green" of a golf link, but it may advantageously be used in the care and improvement of lawns or swards of larger dimensions, and is especially advantageous when the lawn is situated on a hill-side or incline.

The usual method of treating a "putting green" is to sow the grass seed in a top dressing of soil that must be superposed or applied upon the existing turf. This operation renders the green very objectionable to the devotees of the game by the increased resistance, thus interposed, to the movement of the ball over the green and by the mud produced when the top dressing is moistened. My invention overcomes these and other objections of older methods and permits efficacious treatment of the "green" in the hottest weather and at such times when the old method of treatment would be useless. It also permits the applied water to soak into the soil or ground, causing the grass roots to grow downwardly, instead of upwardly, after the water. Thus the roots will not be burned and destroyed by the intense heat of the sun.

In carrying my new method of turf treatment and cultivation into effect I first cut the grass rather short and to a substantially uniform height, as with a lawn mower, or otherwise. Then, at suitable intervals, from one to three inches apart in parallel rows I slash or cut through the matted root stratum of the sward with a suitable instrument, preferably such as a series of spaced-apart rotary disks or cutting knives, having beveled cutting edges whereby to laterally compress and separate the turf on either side of the knives into parallel strips or blocks and substantially at the same time, or very soon thereafter I uniformly distribute grass seed over the slashed area, preferably from a seed distributer, immediately following the cutting knives. The knives, as they progress, laterally compress the adjoining strips and blocks of turf, on either side, thus leaving temporary grooves or incisions through the root skin or mat, exposing the underlying mold or soil. I may then repeat this operation at an angle to the direction of the first series of incisions. Thus when I make the second series of cuts or incisions, at right angles to the first series I divide the mat or root stratum into substantially square blocks. When necessary I may further divide the square blocks by passing the cutters through them at other suitable angles. After the turf has been thus treated, or divided into relatively small squares or areas, to a suitable extent, I cover the entire area with water, preferably applied with a fine spray from a hose. This irrigating operation washes the grass seed, that may have been caught and held by the grass surface above, into the open incisions, where they find lodgment in the soil or mold below. The water is absorbed by the underlying mold or soil, entering freely through the incisions made through the otherwise practically impervious root mat of the turf,—and sinks down into the soil instead of merely dampening the upper surface and running off over the practically impervious root mat as usual,—until the turf becomes saturated sod. I then roll the treated area with a suitable roller. This latter operation flattens out and extends the compressed strips or blocks of turf, between adjacent incisions, thereby closing these grooves or incisions leaving the seeds in the soil or mold below the top grass surface, where they are protected from the direct rays of the sun and from birds and insects and where they soon germinate and sprout after which they are protected and shaded by the grass and its roots until large enough to be clipped by the lawn mower. When the sward or lawn is located on a hill-side or incline, I prefer to make the series of parallel incisions only across the direction of inclination. This prevents "washing" and permits the seeds to more freely enter the open incisions. The incisions made through the turf soon heal and after the rolling process they cannot be seen. The treatment of the turf or putting green, in the manner described, does not interfere with its normal use. A few hours after the treatment one could not tell from a superficial examination that the turf had been disturbed or that any seed had been planted.

In carrying my invention into effect I may mix sand, lime, or a comminuted fertilizer either or all with the seed and wash the mixture into the incisions with a spray of water at the time when the seeds are thus forcibly driven into said incisions, thereby introducing with the seed the sweetening or fertilizing solution and matter directly into contact with the underlying soil or mold.

The numerous incisions made in the turf separate the leaves or branches of the weeds from the parent stocks, which causes them to perish, and the roots may thereafter be pulled from the ground without abrading or mutilating the upper surface of the turf.

The machine, by which my invention may conveniently and cheaply be carried into effect is illustrated in the drawings wherein—

10 is a frame comprising the side members 11—11 and the end members 12—12 and braces 13—13 interposed between the end members to strengthen them. A handle 14 is secured between the members of the end plates 12 by means of upturned flanges 15 and bolts 16. The handle 14 may be the means by which the machine is pushed across the lawn or it may be connected to a suitable vehicle. A shaft 17, finds bearing in the frame members 11—11 and contains a series of rotary disks 18 threaded thereon and separated by collars 19. The cutting edges of the disks are beveled, as at 20, so as to provide the proper incision and to laterally compress the strips or blocks of turf between adjacent disks to leave the incisions open and the soil below exposed to view. A nut 21 is threaded on each end of the shaft 17 and holds the collars 19 and the disk 18 tightly in place. Another shaft 22 is secured in the frame members 11, by means of screw threaded nuts 23—23, and carries two wheels 24—24 which are secured in place by collars 25—25 and are freely rotatable upon or with the shaft 22. These wheels are normally out of contact with the ground, or the surface over which the machine is being propelled, except when it is desired to lift the knives or disks 18 out of contact therewith in order to turn the machine and change its direction of progress, at which time the handle 14 and machine are placed in dotted line position when the wheels 24 will be brought into contact with the surface of the earth and the machine can thereby be readily turned.

In Figs. 5 and 6 I have shown a seeding drum 26 mounted upon bearing brackets 27—27 that are secured to the braces 13—13 of the frame. On the shaft 28, of the drum 26, is mounted a sprocket wheel 29, a similar sprocket wheel 30 being mounted on the shaft 17. A sprocket chain 31 connects the sprocket wheels 29 and 30 and is the means for transmitting motion from the shaft 17, containing the rotary disks 18, to the drum 26. The drum is provided with a series of perforations 31, or it may well be made of wire cloth, or other foraminous material, through which the grass seed and other material to be distributed, will pass when the drum is being rotated. Rotation of the drum 26 may be stopped by removing the sprocket wheel 29 by taking out the cotter pin 33, and disconnecting the clutch members 34, or the entire drum may be removed, when desired, by taking out the attaching bolts that secure the bearing brackets 27 in place on the braces 13. A door 35 is made to close an opening in the peripheral wall of the drum 26, being hinged, as at 37, and supplied with any convenient means of securing it in closed position. Through this door, seed, lime, fertilizer, or whatever material to be distributed, may be passed into the drum and through which the drum may be cleansed of the refuse material, at any time.

Having described my invention, what I claim is:

1. The method of cultivating and treating a grass plot or green sward which consists in cutting the grass to a substantially uniform short length; slashing the turf at intervals, by making a series of relatively long parallel incisions through the root mat; laterally compressing the sward between adjacent incisions to leave said incisions open; sowing seeds on the sward; applying water in a spray to wash the seeds that may have found lodgment on the turf into said incisions and to soften the turf, then expanding said intervening pieces of wet turf, or sod, by rolling to close said incisions to cover the seed and to smooth the surface.

2. The method of cultivating and treating a grass plot or green sward which consists in cutting the grass to a substantially uniform short length; slashing the turf at intervals by making a series of relatively long parallel incisions through the root mat; making another series of incisions across the first series, thereby dividing the turf into small blocks without lifting it; compressing the sward between adjacent incisions, as the incisions are made, to leave said incisions open; sowing seed on the sward; applying water in a spray to wash the seed, that may have found lodgment on the turf, into said incisions and to soften the turf, then expanding the said intervening pieces of wet turf or sod, by rolling to close said incisions to cover the seed and to smooth the surface.

3. The method of cultivating, propagating and treating grass upon a plot or green sward which consists in cutting the grass to a substantially uniform short length; slashing the turf at intervals to make a series of relatively long parallel incisions through the root mat; laterally compressing the sward between adjacent incisions, as the incisions are made to leave said incisions open; sowing seeds on said sward at substantially the same time when said incisions are made; applying water in a spray to wash the seeds that may have found lodgment on the turf into said incisions and to soften the turf, then laterally expanding the said intervening pieces of wet turf, or sod, by rolling to close said incisions, cover the seed and to smooth the surface.

4. The method of cultivating and treating a grass plot or green sward which consists in cutting the grass to a substantially uniform short length; slashing the turf at intervals by making a series of relatively long parallel incisions through the root mat into the soil below; laterally compressing the sward between adjacent incisions to leave said incisions open; uniformly distributing materials to be introduced below the root mat on said sward; washing said materials into said incisions by application of water, then closing said incisions by rolling.

5. The method of treating a grass plot or green sward which consists in slashing the turf at intervals, by making a series of relatively long parallel incisions through the root mat; sowing seeds on the sward; applying water in a spray to wash the seeds into the incisions and to soften the turf, then expanding the intervening pieces of turf or sod, by rolling to close the incisions and smooth the surface.

In testimony whereof I hereunto set my hand in the presence of two subscribing witnesses.

EDWARD C. BERRIMAN.

In the presence of—
 STANLEY W. COOK,
 MARY F. ALLEN.